United States Patent
Leon et al.

(10) Patent No.: US 11,763,397 B2
(45) Date of Patent: Sep. 19, 2023

(54) ONLINE COMMUNITY BUILDING RECOMMENDER

(71) Applicant: Microsoft Technology Licensing, LLC, Redmond, WA (US)

(72) Inventors: Adam Leon, San Francisco, CA (US); David Golland, Oakland, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 409 days.

(21) Appl. No.: 17/139,731

(22) Filed: Dec. 31, 2020

(65) Prior Publication Data

US 2022/0207620 A1    Jun. 30, 2022

(51) Int. Cl.
*G06Q 50/00* (2012.01)
*G06F 16/953* (2019.01)
*H04L 67/10* (2022.01)
*H04L 67/306* (2022.01)
*H04L 51/52* (2022.01)
*H04L 67/01* (2022.01)

(52) U.S. Cl.
CPC .......... *G06Q 50/01* (2013.01); *G06F 16/953* (2019.01); *H04L 51/52* (2022.05); *H04L 67/10* (2013.01); *H04L 67/306* (2013.01); *H04L 67/01* (2022.05)

(58) Field of Classification Search
CPC ....... G06Q 50/01; G06F 16/953; H04L 51/52; H04L 67/10; H04L 67/306; H04L 67/01
USPC ......... 705/319; 709/203, 201, 204, 206, 217
See application file for complete search history.

(56) References Cited

U.S. PATENT DOCUMENTS

| | | | |
|---|---|---|---|
| 2008/0077614 A1* | 3/2008 | Roy | G06F 16/9535 |
| 2009/0234876 A1* | 9/2009 | Schigel | G06Q 30/02 |
| | | | 707/999.102 |
| 2012/0124456 A1* | 5/2012 | Perez | H04N 21/44218 |
| | | | 715/200 |
| 2017/0093780 A1* | 3/2017 | Lieb | H04L 51/18 |

* cited by examiner

*Primary Examiner* — Kaylee J Huang
(74) *Attorney, Agent, or Firm* — Schwegman, Lundberg & Woessner, P.A.

(57) ABSTRACT

A method and system for providing recipient recommendations to a user wishing to share content with a contact is provided. A message having the content along with a first contact is received from the user. Profiles from an entire social graph associated with the user and the first contact are searched to determine a shared attributed among both profiles. The shared attribute is used to search for a second contact to receive the content by searching for the shared attribute in a profile associated with the second contact. When a determination is made that the profile associated with the second contact has the shared attribute, the second contact is suggested as a recipient of the content.

19 Claims, 11 Drawing Sheets

200 ⤴

| | |
|---|---|
| Undergraduate School 202 | TP1 |
| Graduate School 204 | TP2 |
| Previous Place of Employment 206 | TP3 |
| Previous Place of Employment 208 | TP4 |
| Current Place of Employment 210 | TP5 |
| Professional Conference Attendee 212 | TP6 |
| Job Description Attribute 214 | TP7 |

400 ⟶

| | |
|---|---|
| Undergraduate School 202 | TP8 |
| Graduate School 402 | TP9 |
| Previous Place of Employment 404 | TP10 |
| Current Place of Employment 210 | TP4 |
| Job Description Attribute 214 | TP7 |

| | |
|---|---|
| Undergraduate School 202 | TP1 |
| Graduate School 204 | TP2 |
| Previous Place of Employment 206 | TP3 |
| Previous Place of Employment 502 | TP12 |
| Current Place of Employment 210 | TP11 |
| Professional Conference Attendee 212 | TP6 |
| Job Description Attribute 214 | TP7 |

FIG. 5

ONLINE COMMUNITY BUILDING RECOMMENDER

TECHNICAL FIELD

This application relates to the technical fields of software and/or hardware technology and, in one example embodiment, to a system and method for recommending users of an online community.

BACKGROUND

Typically, when a user desires to share content, a determination needs to be made regarding who should receive the content. It would be desirable to automatically recommend recipients based on the connections of the user in a social network or the content itself. However, a computing cannot necessarily determine candidates in a social network to recommend to the user without having a seed, such as a contact of a user, that can be used for making these determinations. Problems arise when the computing device uses the wrong contact to start making recommendations for candidates who should receive the content. In particular, a user may disagree with all of the candidates recommended by the computing device.

Accordingly, what is needed is a system that determines what candidates should be a part of a community that receives shared content. The system should be able to identify similarities between a builder sharing the content and candidates who may be recommended to be part of the community.

BRIEF DESCRIPTION OF DRAWINGS

Embodiments of the present invention are illustrated by way of example and not limitation in the figures of the accompanying drawings, in which like reference numbers indicate similar elements and in which:

FIGS. 4 and 5 show user profiles associated with contacts of a user, in accordance with embodiments of the present disclosure.

DETAILED DESCRIPTION

Figure 1:
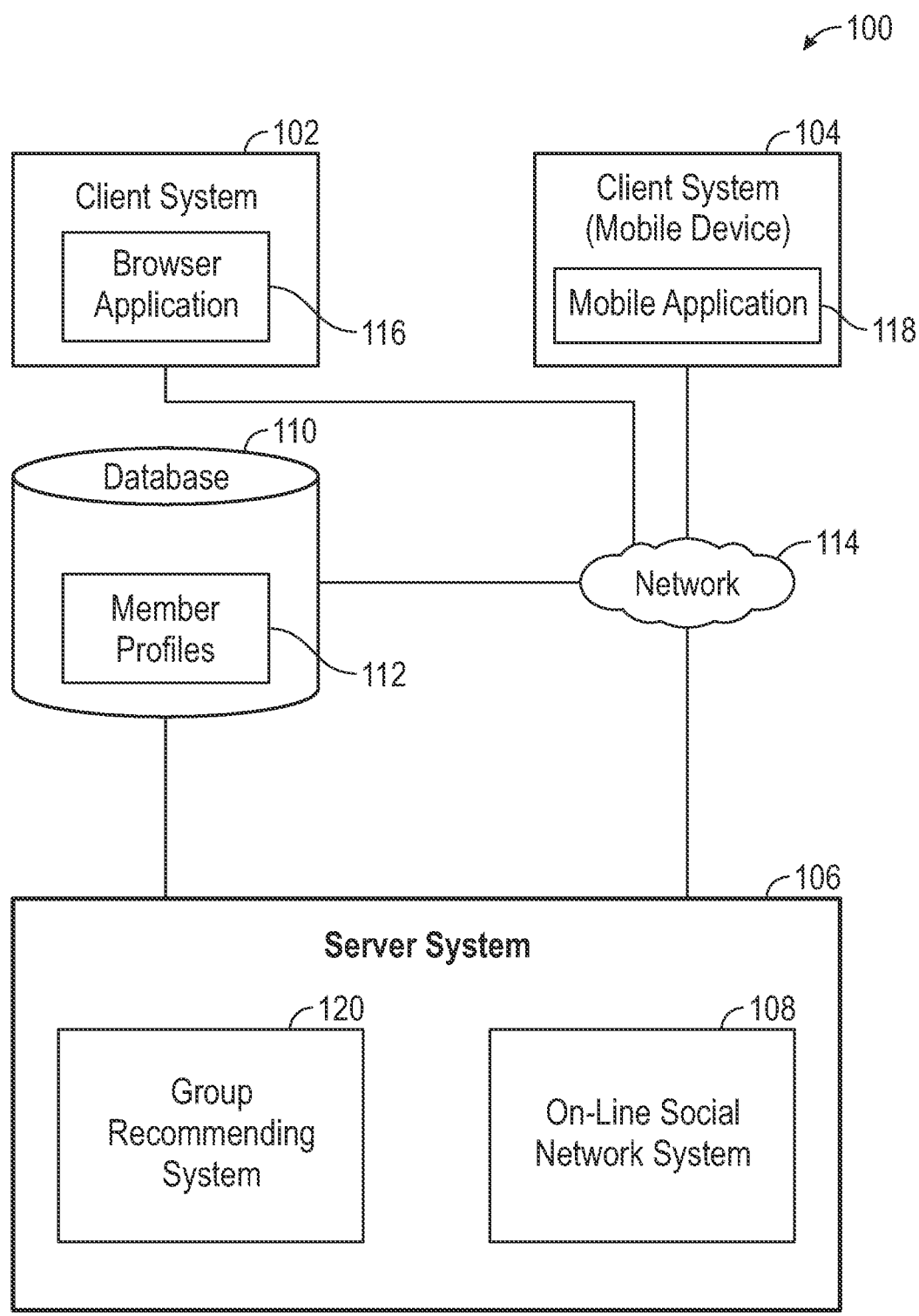
FIG. 1 is a diagrammatic representation of a network environment within which an example method and system for determining connection suggestions in an online social network system may be implemented, in accordance with embodiments of the present disclosure.

A method and system for determining connection suggestions in an online social network system is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an online social networking application" may be referred to as and used interchangeably with the phrase "an online social network" or merely "a social network." It will also be noted that an online social network may be any type of an online social network, such as, e.g., a professional network, an interest-based network, or any online networking system that permits users to join as registered users. For the purposes of this description, registered users of an online social network may be referred to as simply users.

Embodiments of the present disclosure address problems associated with suggesting recipients of content. In particular, when a user desires to send media content, a computing device does not know how to determine who should receive the content without receiving input from the user. For example, the user must input the recipients of the content. Current computing devices are incapable of identifying potential recipients of the content based on attributes associated with the user. Moreover, currently, machine learning techniques are incapable of discerning patterns among recipients selected to receive content being sent from a user, and based on the discerned patterns, suggesting recipients of content to the user at a later time.

Accordingly, what is needed is a computing device capable of suggesting recipients of content to a user desiring to send content. In particular, embodiments of the present disclosure provide a system that uses machine learning to recommend an online group to receive content. In some embodiments, a user employs a messenger function to share content where the user enters recipients and a computing device suggests other contacts in a social or professional circle of the user who should also receive content. The computing device employs machine learning techniques to refine a process of making the suggestions. In an embodiment, a user wishing to share content has an associated user profile that includes various attributes. Furthermore, the recipients of the content entered at the messaging function also have an associated user profile that includes various attributes. The computing device identifies attributes shared in the user profiles using identifiers associated with each of the attributes. In an embodiment, when the computing device identifies an attribute that is shared among the user and the recipients, a search is conducted of other contacts in the social or professional circle of the user. In particular, a search is conducted for other users having the attribute shared between the user and the recipients of the content entered at the messaging function.

In an embodiment, other users having the attribute shared between the user and the recipients of the content entered at the messaging function are identified and suggested to the user as candidates to receive the content by the computing device. In some embodiments, the user may elect to keep some of the suggested candidates while rejecting others of the suggested candidates. In an embodiment, machine learning techniques may be employed to learn various attributes that are shared by the suggested candidates elected by the user. Moreover, machine learning techniques may be employed to learn various attributes that are shared by the suggested candidates rejected by the user. Therefore, when suggesting candidates at a later time, based on the attributes shared by the elected suggested candidates and the attributes of the suggested candidates rejected by user, the computing device may suggest candidates to receive content that are more likely to be elected by the user as recipients of content the user wishes to share via a messaging function.

In an embodiment, one or more machine learning models are generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with input and, optionally, users. The statistical model is trained based on multiple attributes (or factors) described herein. In machine learning parlance, such attributes are referred to as "features." To generate and train a statistical model, a set of features is specified and a set of training data is identified.

Embodiments are not limited to any particular machine learning technique for generating or training a machine learning model. Example machine learning techniques include linear regression, logistic regression, neural networks, random forests, naive Bayes, and Support Vector Machines (SVMs). Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

Initially, the number of features that are considered for training may be significant. After training a machine learning model and validating the model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features will little predictive power may be removed from the training data. Removing such features can speed up the process of training future models and computing output scores.

Now making reference to the Figures and in particular FIG. 1, as shown, the network environment 100 may include client systems 102 and 104 along with a server system 106. The client system 102 can be implemented as any type of computing device, such as a server computer, a personal computer (PC), or the like having a processor configured to perform the subject matter disclosed herein. The client system 104 can be a mobile device, such as, e.g., a mobile phone or a tablet. The server system 106, in one example embodiment, can host an online social network system 108. The server system 106 can be implemented as any type of computing device, such as a server computer, a PC, or the like having a processor configured to perform the subject matter disclosed herein. In an embodiment, the server system 106 can employ artificial intelligence techniques (e.g., neural networks, natural language processing, classification algorithms, clustering algorithms, etc.) in order to identify and recommend contacts to a user. In an embodiment, as will be discussed in greater detailed below, a neural network is trained to provide contact recommendations to a user who should receive media content from the user and receive feedback from the user regarding the contact recommendations. For example, the user may approve or decline ones of the contact recommendations. Based on attributes associated with the approved and declined contacts received from the user, the neural network will refine techniques used to suggest contacts to the user in the future. In particular, the artificial intelligence techniques, such as a neural network, can mimic cognitive functions, such as learning and problem solving, in order to identify attributes common to contacts approved by the user and contacts declined by the user, as one skilled in the art would readily appreciate. Furthermore, the artificial intelligence processes executing on the server system 106 can learn new heuristics while identifying attributes common to contacts approved by the user and contacts declined by the user. As will be discussed in greater detail below, the server system 106 performs a number of operations and functions. In embodiments, the artificial intelligence techniques embodied as software executing on one or more hardware processes of the server system 106 performs these operations and functions. Thus, when the disclosure discusses the server device 106 performing an operation, it should be understood that this may be equivalent to the artificial intelligence within the server system 106 performing the operation.

As explained above, each user of an online social network is represented by a user profile that has personal and professional information about the user and that may be associated with social links that indicate the user's connection to other user profiles in the online social network. User profiles and related information may be stored in a database 110 as user profiles 112.

A user profile of the user profiles 112 can be associated with social links that indicate the connections of a user to other users of the social network. A user profile can also include or be associated with comments or recommendations from other users of the online social network, with links to other network resources, such as, e.g., publications, etc. An online social networking system may be designed to allow registered users to establish and document networks of people they know and trust professionally.

A user profile of the user profiles 112 can also include profile information of the user associated with the user profile. The profile information can include various information such as, e.g., the name of a user, current and previous geographic location of a user, current and previous employment information of a user, information related to education of a user, information about professional accomplishments of a user, publications, patents, etc. The profile information of a social network user can also include information relating to professional skills of the user. A particular type of information that may be present in a profile, such as, e.g., company, industry, job position, etc., is referred to as a profile attribute. A profile attribute for a particular user profile may have one or more values. For example, a profile attribute may represent a company and be termed the company attribute. The company attribute in a particular profile may have values representing respective identifications of companies, at which the associated user has been employed. Other examples of profile attributes are the industry attribute and the region attribute. Respective values of the industry attribute and the region attribute in a user profile may indicate that the associated user is employed in the banking industry in San Francisco Bay Area. Moreover, in accordance with an embodiment, an attribute can correspond to any type of derivable data, such as data describing a feed post, a comment, or the like.

Figures 2, 3:
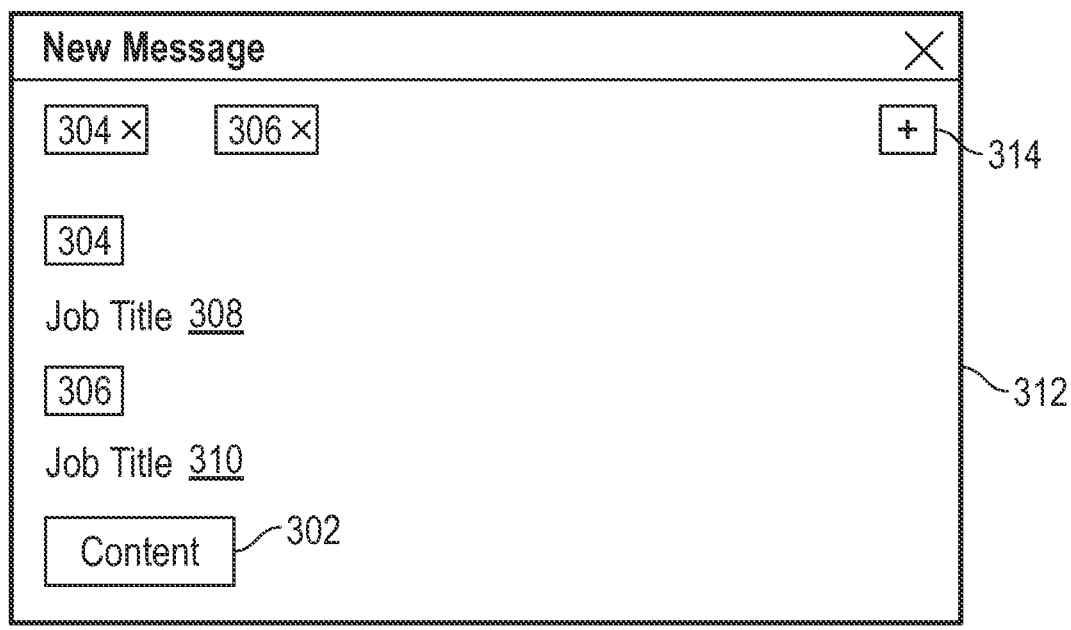
FIG. 2 illustrates a user profile, in accordance with embodiments of the present disclosure.
FIG. 3 illustrates a message that can be generated with a messaging application that a user can employ to create a group communication session, such as a group chat, to share media content, in accordance with embodiments of the present disclosure.

As a further example of a user profile, reference is made to FIG. 2, which illustrates a user profile 200 in accordance with an embodiment of the present disclosure that can be stored at the database 110 with the user profiles 112. In an embodiment, the user profile 200 can include a plurality of profile attributes 202-214. In an embodiment, the profile attributes 202-214 can include an undergraduate school attribute 202, a graduate school attribute 204, and place of employment attributes 206-210. In addition, the profile attributes 202-214 can include a professional conference attendee attribute 212 along with a job description attribute 214.

Moreover, the user profile 200 can include time periods TP1-TP7 that correspond to the attributes 202-214. For example, the undergraduate school attribute 202 can correspond to the time period TP1 while the graduate school attribute 204 can correspond to the time period TP2. Moreover, the previous place of employment attribute 206 can correspond to the time period TP3, the previous place of employment attribute 208 can correspond to the time period TP4, and the previous place of employment attribute 210 can correspond to the time period TP5. Furthermore, the professional conference attendee attribute 212 can correspond to the time period TP6 while the job description attribute 214 can correspond to the time period TP7.

In accordance with embodiments of the present disclosure, the time periods TP1-TP7 can be contiguous or can overlap with each other. For example, a portion of the time period TP2 may overlap with a portion of one of the time periods TP3-TP6. Thus, the user associated with the user profile 200 may have attended graduate school while the user was at one of the previous places of employment 206 and 208, at their current place of employment 210, or was at a professional conference as indicated by the professional conference attendee attribute 212. As a further example, the time period TP6 may overlap with one of the time periods TP1 or TP2, such that the user associated with the user profile 200 may have attended the professional conference as an attendee while the user was in undergraduate school or in graduate school. Moreover, the time period TP7 can overlap with any of the time periods TP2-TP6, either singularly or in combination, such as simultaneously overlapping with TP2, TP3, and TP6. While one user profile 200 is shown as being stored at the database 110, in accordance with embodiments of the present disclosure, multiple user profiles similar to the user profile 200 can be stored with the user profiles 112 at the database 110. Here, ones of the multiple user profiles can include attributes similar to the profile attributes 202-214 where the profile attributes can be associated with time periods similar to the time periods TP1-TP7.

Returning attention to FIG. 1, the client systems 102 and 104 may be capable of accessing the server system 106 via a communications network 114, utilizing, e.g., a browser application 116 executing on the client system 110, or a mobile application 118 executing on the client system 104. The communications network 114 may be a wired network, a wireless network (e.g., a mobile or cellular network), or any suitable combination thereof. The network 108 may include one or more portions that constitute a private network, a public network (e.g., the Internet), or any suitable combination thereof. Accordingly, the communications network 114 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof.

As shown in FIG. 1, the server system 106 can also host a group recommending system 120 that can be part of or in communication with the online social network system 108. As will be discussed in further detail below, the group recommending system 120 can recommend contacts for a group chat related to media content when a user decides to share the content with others in a network of the user. For example, using a social media messaging application, such as the messaging application available from LinkedIn™, a user may decide to share the media content with contacts that are associated with the user. In accordance with an embodiment, the group recommending system 120 can recommend contacts of the user who should receive the media contact feed. An example of a user sharing media content with contacts of the user is shown in greater detail with reference to FIG. 3.

FIG. 3 illustrates a message 300, that can be generated with a messaging application, such as the messaging application available from LinkedIn™, that a user can employ to create a group communication session, such as a group chat, to share media content 302. Furthermore, a user can employ the message 300 to send and receive comments relating to the media content 302. Examples of the media content 302 can include multimedia feeds, such as video/audio feeds; text based content; or any other type of content. Moreover, the media content 302 can relate to matters associated with the current place of employment as reflected in the current place of employment attribute 210. A user can employ the message 300 to send the media content 302 to contacts associated with the user. In accordance with an embodiment, when the user enters a name of a input user 304 along with a name of an input user 306 in the message 300, job titles 308 and 310 respectively associated with the input users 304/306, are listed at a user interface 312 of the message 300. Thus, in some embodiments, the input users 304/306 are preselected by a builder. In an embodiment, the builder may be a user who is creating the community that will receive the message 300. Furthermore, the input users 304/306 can be used as starting points for the group recommending system 120 to discern further candidate as recipients of the message 300, as will be discussed further on. It should be noted that other types of attributes can also be listed in the message 300. In an embodiment, the input user 304 can include a user profile 400, as shown with reference to FIG. 4, that can be used to suggest other contacts of the user who should receive the media content 302.

Making reference to FIG. 4, the user profile 400 associated with the input user 304 that can be stored at the database 110 with the user profiles 112 is shown in accordance with an embodiment of the present disclosure. In an embodiment, the user profile 400 can include the graduate school attribute 204 at a time period TP9 and the current place of employment attribute 210 at the time period TP4. Moreover, the user profile 400 can have the job description attribute 214 at the time period TP7 along with an undergraduate school attribute 202 at a time period TP8 and a previous place of employment attribute 404 at a time period TP10. In accordance with embodiments of the present disclosure, the time periods TP4, TP7, and TP8-TP10 may be contiguous or may overlap with each other. For example, a portion of the time period TP9 may overlap with a portion of one of the time periods TP4, TP7, or TP10. Thus, the input user 304 may have attended graduate school while the input user 304 was at one of the previous place of employment 404 or at the current place of employment 210. Moreover, the input user 304 may have attended graduate school while the input user 304 had the job description attribute 214. As a further example, the time period TP7 may overlap with one of the time periods TP4 or TP10, such that the input user 304 had the job description 214 during one or both of the time periods TP4 and TP10 when the contact was employed at each of the organizations with the current place of employment attribute 210 and the previous place of employment attribute 404.

Similarly, the input user 306 can also have a user profile 500, as shown with reference to FIG. 5 and which can be stored at the database 110 with the user profiles 112. In an embodiment, the user profile 500 can include the graduate school attribute 204 at the time period TP2 and the current place of employment attribute 210 at a time period TP11. Moreover, the user profile 500 can have the job description attribute 214 at the time period TP7 along with an undergraduate school attribute 202 at the time period TP1 and the previous place of employment attribute 206 at the time period TP3. The user profile 500 can also have the professional conference attendee attribute 212 at the time period TP6. Furthermore, the user profile 500 can have the previous place of attribute 502 at a time period TP12. In accordance with embodiments of the present disclosure, the time periods TP1-TP3, TP6, TP7, TP11, and TP12 can be contiguous or can overlap with each other. For example, a portion of the time period TP2 may overlap with a portion of one of the time periods TP3, TP7, TP11 or TP12. Thus, the input user 306 may have attended graduate school while the input user 304 was at one of the previous place of employment 206 or 502 or at the current place of employment 210. Moreover, the input user 306 may have attended graduate school while the input user 306 had the job description attribute 214. As a further example, the time period TP7 can overlap with one of the time periods TP3, TP11, or TP12, such that the input user 306 had the job description 214 during one or a combination of the time periods TP3, TP11, or TP12 when the input user 306 was employed at each of the organizations associated with the previous place of employment attribute 206 or 502 or the current place of employment attribute 210.

Returning attention to FIG. 3, the message 300 can include a selector 314 that a user can engage to add additional contacts to the message 300. In particular, when a user engages the selector 314, the group recommending system 120 can suggest additional contacts to the user. In an embodiment, when a user engages the selector 314, the group recommending system 120 can examine a profile associated with a user along with a profile associated with the input users 304/306 in order to suggest additional candidates for recommendation to add to the message 300. In particular, the group recommending system 120 can identify attributes in the user profile 400 associated with the input user 304 that are shared with attributes in the user profile 200 associated with the user. Furthermore, the group recommending system 120 can identify attributes in the user profile 500 associated with the input user 306 that are shared with attributes in the user profile 200 associated with the user.

The group recommending system 120 considers an attribute of the user, such as any one of the undergraduate school attribute 202, the graduate school attribute 204, the previous place of employment attribute 206, the previous place of employment attribute 208, the current place of employment attribute 210, the professional conference attendee attribute 212, or the job description attribute 214, or any combination of these attributes, and how the attribute of the user relates to the input user 304. The group recommending system 120 builds the communication, such as a group chat using the message 300, by examining attributes of the input users 304/306 and recommending other contacts based on any similarities relative to the user. In some embodiments, a personalized graph structure illustrating connections of the user may be used to suggest contacts when building the communication, as shown with reference to FIG. 6.

Figure 6:
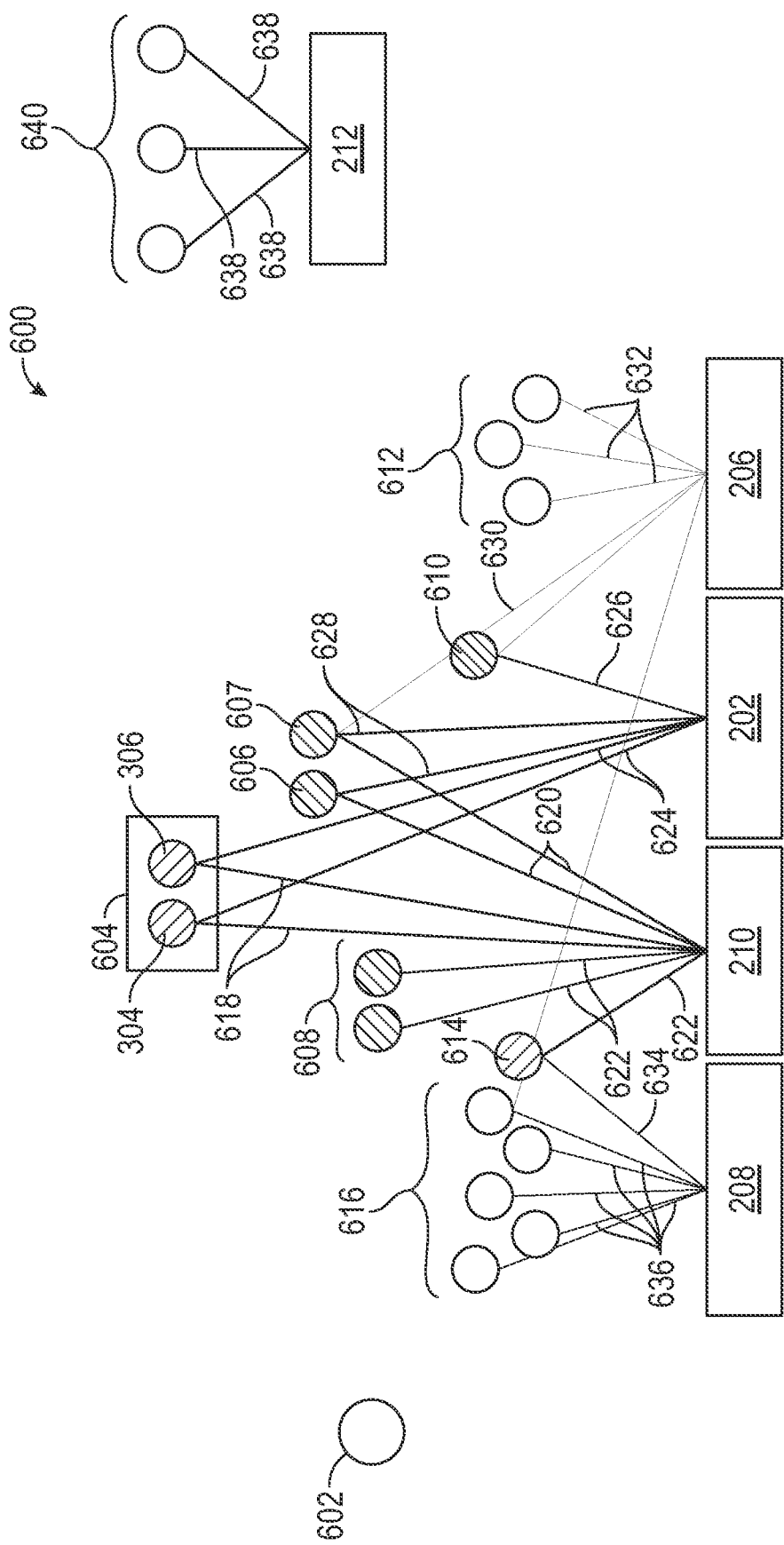
FIG. 6 is an attribute graph, in bipartite form, that illustrates the associations of a user with contacts of the user based on attributes of the user reflected in the user profile of FIG. 2 associated with the user, in accordance with embodiments of the present disclosure.

FIG. 6 is an attribute graph 600, in bipartite form, that illustrates the associations of a builder 602 with contacts of the builder 602 based on attributes of the builder 602 reflected in the user profile 200 associated with the builder 602, in accordance with embodiments of the present disclosure. In an embodiment, the builder may be a user who is creating the community that will receive the message 300. In an embodiment, all attributes, such as the profile attributes 202-214, 402, 404, and 502, are downloaded from each of the user profiles, such as the user profiles 200, 400, and 500. A data structure can be built using the downloaded attributes where a unique identifier is assigned to each attribute. In an embodiment, the same attribute has the same identifier. For example, each of the user profiles include the undergraduate school attribute 202. In an example, this attribute can correspond to a school attended by a user associated with the user profiles 200, 400, and 500. In this example, if each of the users attended the Georgia Institute of Technology™ where the undergraduate school attribute 202 corresponded to the Georgia Institute of Technology™, these attributes can be assigned the same unique identifier. In an embodiment, any type of program can be used to download the profile attributes 202-214, 402, 404, and 502 from the user profiles 200, 400, and 500. In an embodiment, this can be accomplished as a background process. Moreover, any type of program can be used to create a data structure that can be stored to a key value table, such as any type of distributed key value datastore for online retrieval on demand. As discussed above, attributes that are shared among the user and the input users 304/306 can be identified. In an embodiment, the shared attributes can be identified based on the identifiers that are associated with the shared attributes. In an embodiment, the builder 602 can correspond to the user discussed with reference to FIG. 3 that employed the message 300 to send and receive comments relating to the media content 302. In addition, the user profile 200 can be the user profile associated with the builder 602 and the attribute graph 600 illustrates the undergraduate school attribute 202 along with the previous place of employment attributes 206/208 and the current place of employment attribute 210. It should be noted that while the attribute graph 600 illustrates the undergraduate school attribute 202, the previous place of employment attributes 206/208 along with the current place of employment attribute 210, any attribute associated with a user, such as the graduate school attribute 204, the professional conference attendee attribute 212, or the job description attribute 214, can also be used in the attribute graph 600. In an embodiment, the attribute graph 600 can be precalculated and stored in a database. Thus, when the builder 602 enters the input users 304/306 in the message 300, the attribute graph 600 is prestored such that recommendations for candidates maybe quickly suggested to the builder 602. In an embodiment, the attribute graph 600 can be stored as an adjacency list or an adjacency matrix that links contacts to attributes while at the same time linking attributes to contacts.

The attribute graph 600 includes an input user set 604 that corresponds to the input users 304/306. In an embodiment, input users of the input user set 604, such as the input users 304/306, provide a starting point to the group recommending system 120 to begin building the attribute graph 600. Furthermore, in an embodiment, the attribute graph 600 illustrates an association based on similar attributes between the input users 304/306 and the builder 602. In an embodiment, this association may be characterized as an edge, where the edge can be defined as an attribute that is shared between the contact and the user 302 or with one of the input users 304/306. The attribute graph 600 illustrates edges of the input users 304/306 with contacts 606-616. In accordance with an embodiment of the present disclosure, each of the contacts 606-616 has an attribute shared with ones of the attributes 202-206 and 210-214 of the builder 602. Moreover, based on the attributes associated with each of the contacts 606-616, the contacts 606-616 can be a candidate for recommendation to the user as a recipient of the media content 302. In an embodiment, an attribute that is shared between the builder 602 and one of the input users 304/306 is initially determined. The group recommending system 120 can determine that the input user 304 and the builder 602 each share an attribute. Once this determination is made, user profiles of other contacts in a social or professional circle of the builder 602 can be searched by the group recommending system 120 to determine if the other contacts can be candidates for recommendation to the user as recipients of the media content 302.

To further illustrate, each of the user profiles 200 and 400 can be searched for similar attributes. In an embodiment, the group recommending system 120 can determine that each of the user profiles 200 and 400 include the current place of employment attribute 210. In an embodiment, the attribute graph 600 reflects this shared attribute with edge 618. Thus, in an embodiment, the edge represents an association between the input users 304/306 and the builder 602 based on an attribute shared between the input user 304 and the builder 602, which in this example is the current place of employment attribute 210.

Based on the determination that the input user 304 and the builder 602 share the current place of employment attribute 210, the group recommending system 120 can determine if other contacts associated with the builder 602 include the current place of employment attribute 210. Therefore, attributes shared between the builder 602 and the input user 304 are used to determine other contacts in a social or professional circle of the builder 602 that may be included in the message 300. To further illustrate, the group recommending system 120 can determine that the contacts 606 and 607 also include the current place of employment attribute 210. Thus, edges 620 with the contacts 606 and 607 and the current place of employment attribute 210 are determined by the group recommending system 120 to exist since each of the contacts 606 and 607 include the current place of employment attribute 210. In particular, user profiles associated with the contacts 606 and 607, which are similar to the user profiles 200, 400, and 500, list the current place of employment attribute 210. In a manner similar to that used to determine a connection with the contacts 606 and 607, the group recommending system 120 can determine that the contacts 608 and 614 include the current place of employment attribute 210. Thus, edges 622 can be formed with the contacts 608 and 614 and the current place of employment attribute 210 by the group recommending system 120. Moreover, in an example, since each of the contacts 606-608 and 614 share an attribute, the group recommending system 120 can either assign a score, such as one, to each of the contacts 606-608 and 614, or increment a score. In an embodiment, the score can be indicative of the number of times a contact is discovered based on the shared attribute.

Returning attention to the input user 304 and attributes that are shared between the input user 304 and the builder 602, the group recommending system 120 can determine that each of the user profiles 200 and 400 also include the undergraduate school attribute 202. In an embodiment, the attribute graph 600 reflects this shared attribute with edges 624. Similar to the current place of employment attribute 210, based on the determination that the input user 304 and the builder 602 share the undergraduate school attribute 202, the group recommending system 120 can determine if other contacts associated with the builder 602 include the undergraduate school attribute 202. In an example, the group recommending system 120 can determine that a user profile associated with the contact 610 similar to the user profiles 200, 400, and 500 includes the undergraduate school attribute 202. Therefore, the group recommending system 120 can form an edge 626 between the undergraduate school attribute 202 and the contact 610. The group recommending system 120 determines that the contacts 606/607 include the undergraduate school attribute 202 based on the identifiers associated with the attributes in the user profile 400 of the input user 304 the user profiles associated with the contacts 606/607. Therefore, the group recommendation forms edges 628 between the contacts 606/607 and the undergraduate school attribute 202. In addition, since each of the contacts 606, 607, and 610 share the attribute 202, the group recommending system 120 can assign a score or increment a score associated with the contacts 606, 607, and 610. For example, with regards to the contacts 606/607, the group recommending system 120 can assign a score of one to each of the contacts 606/607. Thus, the group recommending system 120 increments the score, such as changing the score of one to a score of two, for each of the contacts 606/607. Moreover, the group recommending system 120 can assign a score, such as one, to the contact 610.

As discussed above, a user, such as the builder 602, can input the input user 306 into the message 300 that can be used to forward the media content 302. Using the procedure discussed above, the group recommending system 120 can determine that the input user 306 and the builder 602 share the attributes 202 and 210. Moreover, in an embodiment, as discussed above, the group recommending system 120 can determine that the contacts 606-608 and 610 share the attributes 202 and 210. The group recommending system 120 can also determine that the contact 614 shares the attribute 210 with the input user 306. In an embodiment, the group recommending system 120 can also increment the scores associated with the contacts 606-608 and 610 since each of the contacts 606-608 and 610 share the attributes 202 and 210 with the input user 306. As noted above, the group recommending system 120 previously assigned scores of two to the contacts 606 and 607 based on sharing the attributes 202 and 210 and assigned a score of one to the contacts 610 and 614 based on the contact 610 sharing the attribute 210 and the contact 614 sharing the attribute 202. Here, since the contacts 606/607 share two attributes, the attributes 202 and 210, with the input user 306, the group recommending system 120 can increment the scores of the contacts 606/607 by two for an overall score of four. Furthermore, in an embodiment, the group recommending system 120 can increment the score of the contacts 608 by one for an overall score of two since the contacts 608 share the attribute 210 with the input user 306. In addition, the group recommending system 120 can increment the score associated with the contact 610 by one to a score of two since the contact 610 shares the attribute 202 with the input user 306. Therefore, additional discoveries of a contact based on the contact sharing the attribute with additional candidates increases an overall score associated with the contact.

In addition, in some embodiments, different attributes may be considered more important than other attributes. For example, the current place of employment attribute 210 that is shared with the builder 602 can be more important than the undergraduate school attribute 202. In an embodiment, a different score may be assigned based on the importance of the attribute. As an illustration, instead of the group recommending system assigning a value of one to the score when the contacts 606/607 and 608 have the current place of employment attribute 210, the group recommending system can assign a value of two to the score when the contacts 606/607 and 608 have the current place of employment attribute 210 such that the score can be variable based on the shared attribute. Thus, different attributes can be assigned different scores where the values based on an importance of the attribute.

Based on the scores associated with the contacts 606-608, 610, and 614, the group recommending system can recommend the contacts 606-608, 610, and 614 as candidates to receive the media content 302. Furthermore, as discussed above, the scores may be weighted based on an importance of the shared attribute such that group recommending system 120 may factor in the weights when determining a candidate for recommendation as a recipient of the media content 302.

Based on the attributes associated with the input users 304/306 in the user profiles 400 and 500, the contacts 606, 607, 608, 610, and 614 were determined to have attributes similar to the input users 304/306, namely the undergraduate school attribute 202 and the current place of employment attribute 210. In an embodiment, based on the edges 620, 622, and 626 associated with the contacts 606, 607, 608, 610, and 614, user profiles associated with each of the contacts 606, 607, 608, 610, and 614 are searched by the group recommending system 120 to determine if further edges exist. To further illustrate, when a user profile associated with the contact 607 is searched, the group recommending system 120 can determine that the user profile of the contact 607 includes the previous place of employment attribute 206. Thus, an edge 630 exists between the contact 607 and the previous place of employment attribute 206.

Based on the determination that the contact 607 shares the previous place of employment attribute 206, user profiles associated with other contacts of the builder 602 are searched for the previous place of employment attribute 206 by the group recommending system 120. In an embodiment, the group recommending system 120 can determine that user profiles associated with the contacts 612 also include the previous place of employment attribute 206. Therefore, edges 632 can exist between the contacts 612 and the previous place of employment attribute 206.

Similarly, when a user profile associated with the contact 614 is searched, the group recommending system 120 can determine that the user profile of the contact 614 includes the previous place of employment 208. Thus, an edge 634 exists between the contact 614 and the previous place of employment attribute 208. Based on the determination that the contact 614 shares the previous place of employment attribute 208 with the builder 602, user profiles associated with other contacts of the builder 602 are searched by the group recommending system 120 for the previous place of employment attribute 208. In an embodiment, the group recommending system 120 can determine that user profiles associated with the contacts 616 also include the previous place of employment attribute 208. Accordingly, edges 636 can exist between the contacts 612 and the previous place of employment attribute 208.

In some embodiments, as noted above, contacts may share more than one attribute with the user. To further illustrate, the input users 304/306 and 606 shared two attributes with the builder 602, the undergraduate school attribute 202 and the current place of employment attribute 210. Moreover, the contact 607 shares three attributes with the builder 602, the undergraduate school attribute 202, the previous place of employment attribute 206, and the current place of employment attribute 210. Likewise, the contact 614 shares three attributes with the builder 602, the previous place of employment attributes 206/208 and the current place of employment attribute 210.

As noted above, the user profile 200 includes the professional conference attendee attribute 212. As shown with reference to FIG. 6, the attribute graph 600 reflects the professional conference attendee attribute 212 where edges 638 can be formed between the professional conference attendee attribute 212 and contacts 640. However, none of the input users 304/306 and 606-616 are associated with the professional conference attendee attribute 212. Therefore, in an embodiment, an association is not formed by the group recommending system 120 between the input users 304/306 and the contacts 640 for purposes of determining contacts that should receive the message 300 along with the media content 302 such that the contacts 640 will not receive the message 300. As such, the group recommending system 120 slices the contacts 640 from being recommended by the group recommending system 120.

In the embodiments discussed above, the input users 304/306 and 606-616 were determined as sharing an attribute with the builder 602. Moreover, as discussed above, the group recommending system 120 assigned and incremented scores associated with each of the candidates, namely the contacts 606-608, 610, and 614, based on the contacts sharing the attributes 202 and 210 with the input users 304/306. In an embodiment, the group recommending system 120 can rank each of the contacts 606-616 based on the scores associated with the each of the contacts 606-616. Moreover, the group recommending system 120 can determine which of the contacts 606-616 becomes a candidate for recommendation to the builder 602. For example, the group recommending system 120 can determine that contacts exceeding a threshold, such as having a score of three or higher, should be candidates for recommendation. Thus, since the contacts 606/607 each had a score above three, namely a score of four, the group recommending system 120 can determine that the contacts 606/607 should be candidates for recommendation.

Figure 7:
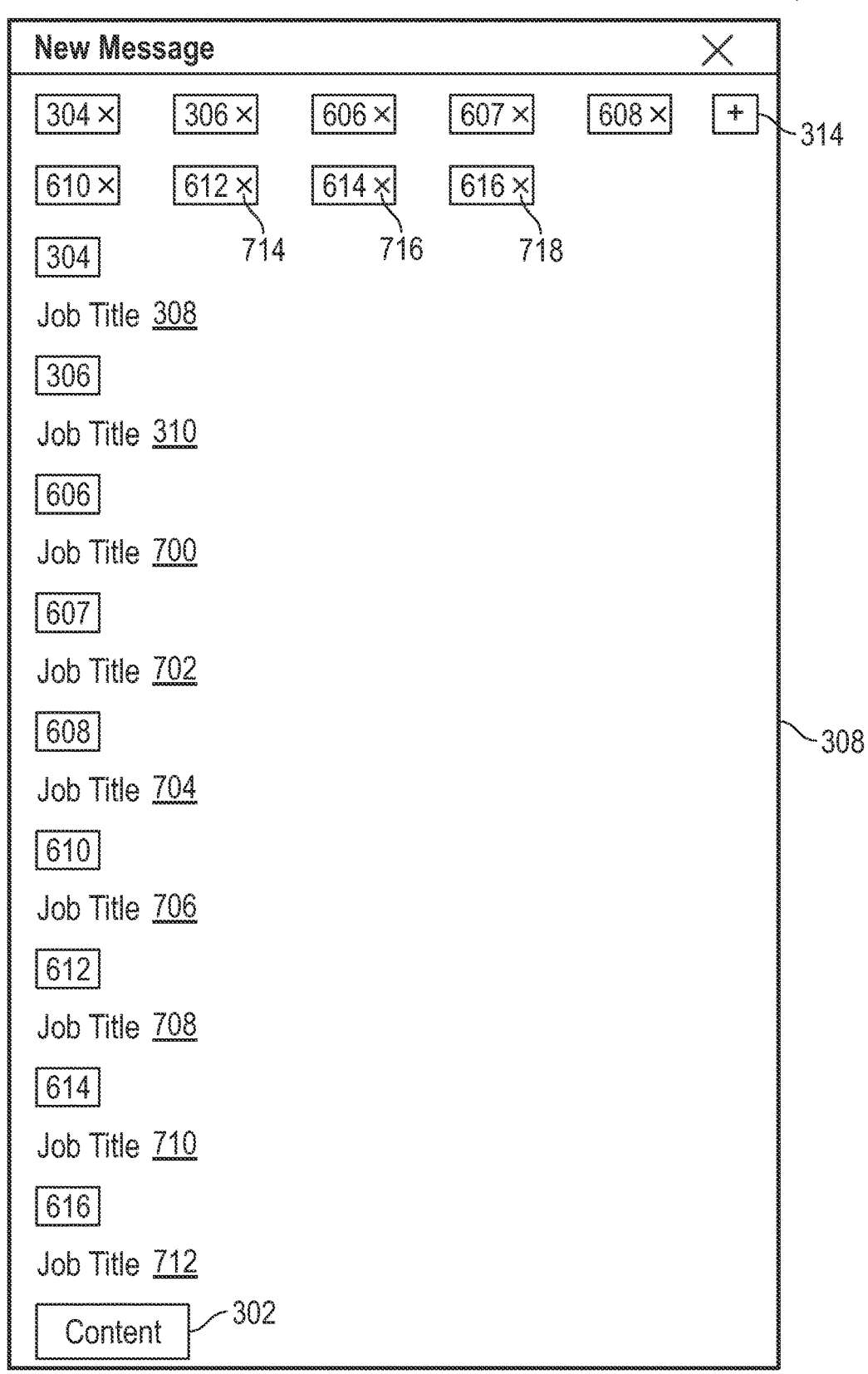
FIGS. 7 and 8 illustrate messages that recommend contacts as additional recipients of media content a user desires to share, in accordance with embodiments of the present disclosure.

In an embodiment, when the builder 602 engages the selector 314 in the message 300, based on the determinations described with reference to FIG. 6, the message 300 can be populated with the contacts 606-616 along with the respective job titles 700-712 associated with each of the contacts 606-616 by the group recommending system 120, as shown with reference to FIG. 7 and a message 714. It should be noted that in some embodiments where the group recommending system 120 uses a threshold to determine a candidate for recommendation, only those candidates having a score that exceeds the threshold will be recommended as candidates by the group recommending system 120. Nonetheless, in an embodiment, the group recommending system 120 can generate the message 714 that recommends the contacts 606-616 as candidates for recommendation such that the contacts 606-616 would be an additional candidate for recommendation as recipients of the media content 302. Therefore, by engaging the selector 314, embodiments of the present disclosure recommend additional contacts who should receive the media content 302. As described above, the additional contacts, such as the contacts 606-616, can be determined based on attributes in the user profiles associated with the contacts 606-616 and the user profile 200 associated with the builder 602.

As detailed above, all contacts having attributes shared with the input users 304/306 and the builder 602 were listed on the message 300. However, in accordance with embodiments of the present disclosure, the builder 602 may decide to trim ones of the contacts 606-616 populated on the message 300. For example, the user may decide that some contacts from the contacts 606-616 should not receive the message 300 and the media content 302. For example, the user may decide that those contacts who only share the previous place of employment attribute 206 should not receive the message 300. As such, the builder 602 can delete the contacts 612 by engaging a selector 715. As noted above, the user profile for the contact 607 also includes the previous place of employment attribute 206. However, the user profile for the contact 607 also includes the undergraduate school attribute 202. Therefore, the builder 602 elects to keep the contact 607 as part of the distribution for the message 300. In an embodiment, when the builder 602 desires to create a communication with a message similar to the message 300 where the builder 602 enters contacts, such as the input users 304/306, any contacts that are found only having the previous place of employment attribute 206 will be disregarded by the group recommending system 120 such that they will not be presented to the builder 602 as described with reference to FIG. 7. It should be noted that the same principles can apply where the group recommending system 120 provided candidates for recommendation based on the candidates for recommendation exceeding a threshold. In particular, the group recommending system 120 will disregard those contacts having a score below a threshold when determining a candidate for recommendation as recipient of media content. Thus, the group recommending system 120 can trims ones of the contacts prior to presenting ones of the contacts 606-616 as candidate for recommendation.

In a further embodiment, the builder 602 can also eliminate those contacts that have the previous place of employment attribute 208, regardless of whether the contact includes another attribute shared with user profile 200 of the builder 602. To further illustrate, the contacts 614 and 616 each have the previous place of employment attribute 208. Since the builder 602 does not want any contacts having the previous place of employment attribute 208, the builder 602 can reject the contacts 614 and 616 by deleting them via selectors 716 and 718, regardless of whether or not the contacts have additional attributes shared with the user profile 200 of the builder 602. Thus, in this illustration, despite the contact 614 also having the current place of employment attribute 210, the builder 602 will delete the contact 614 from the message 300. Therefore, when the builder 602 desires to create a communication with a message similar to the message 300 where the builder 602 enters contacts, such as the input users 304/306, any contacts that are found as described above having the previous place of employment attribute 208 regardless of other attributes the contact may have will be disregarded such that they will not be presented to the builder 602 by the group recommending system 120 as described with reference to FIG. 7.

In an embodiment, a machine learning model can be trained where the builder 602 rejecting the contacts 614 and 616 can be used as a training data input into the machine learning model. To further illustrate, a determination can be made that a commonality among the contacts 614 and 616 is the current place of employment attribute 210. Thus, training data corresponding to the current place of employment attribute 210 may be input as training data such that when the group recommending system 120 is recommending candidates to the builder 602, the machine learning model may learn that contacts having a particular attribute, such as the current place of employment attribute 210, should be given less weight when trying to determine candidates that should be recommended as recipients of content to the builder 602.

Similarly, a machine learning model can be trained where the contacts not rejected by the builder can be used a training data input into the machine learning model. In particular, the builder 602 selects candidates recommended by the group recommending system 120 by keeping the candidates when the candidates are recommended by the group recommending system 120. To further illustrate, a determination can be made that a commonality among the contacts 606-610 is that each of the contacts 606-610 share the undergraduate school attribute 202. Thus, training data corresponding to the undergraduate school attribute 202 can be input as training data such that when the group recommending system 120 is recommending candidates to the builder 602, the machine learning model may learn that contacts having a particular attribute, such as the undergraduate school attribute 202, should be given more weight when trying to determine candidates that should be recommended as recipients of content to the builder 602.

Figure 8:
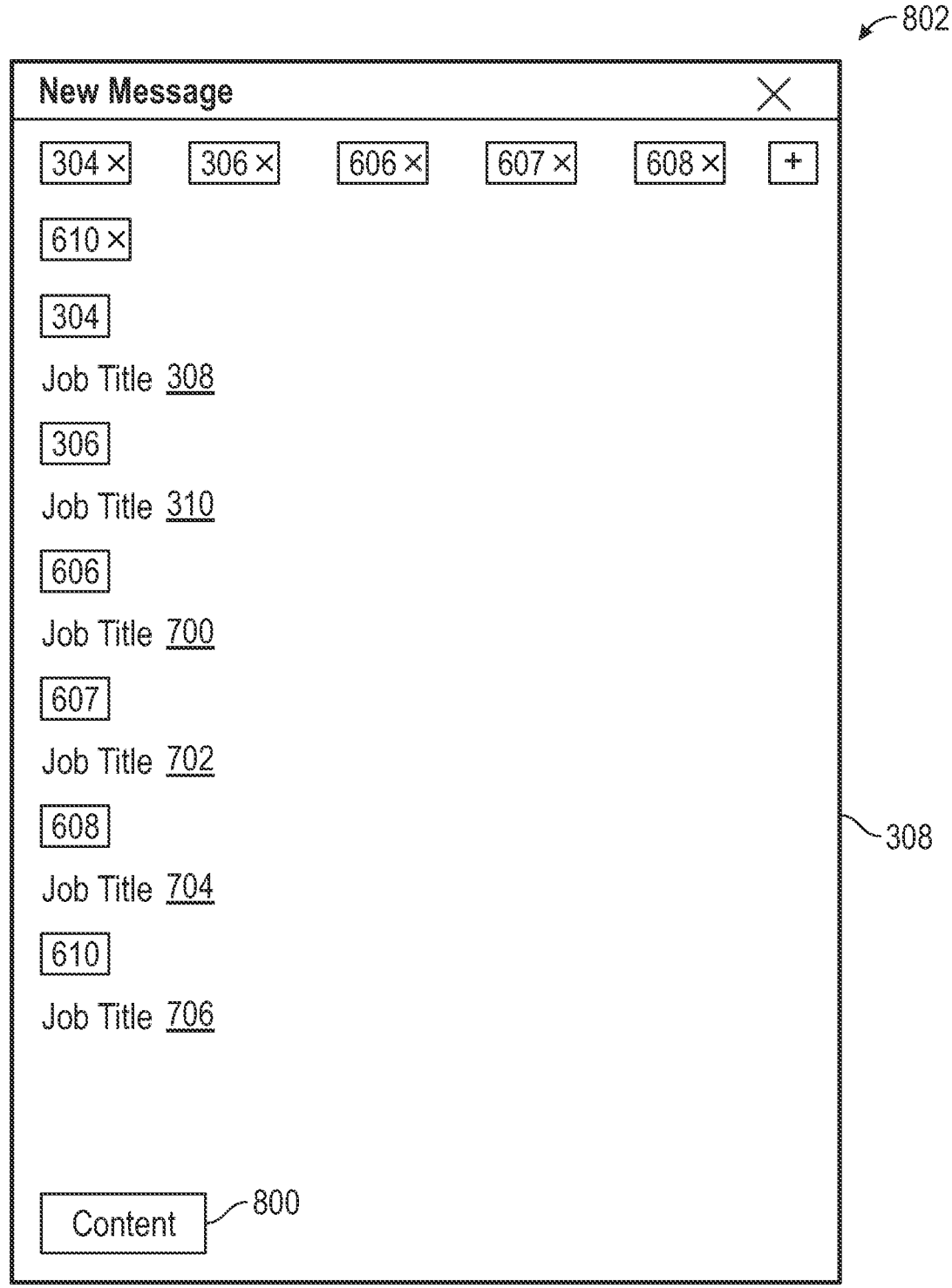

Accordingly, should the builder 602 decide to share media content 800, similar to the message 300, a message 802 can be generated with a messaging application, such as the messaging application available from LinkedIn™, in order to allow for the creation of a group communication session, such as a group chat. Examples of the media content 800 can include multimedia feeds, such as video/audio feeds; text based content; or any other type of content. The user can again decide to enter the input users 304/306. However, since the builder 602 previously declined to include contacts having the previous place of employment attribute 206 and the previous place of employment attribute 208, the contacts 612-616 will not be displayed to the builder 602 in accordance with the techniques described above when the user enters either the input user 304 or the input user 306. Instead, as shown with reference to FIG. 8, the input users 304/306 and 606-610 will be suggested to the builder 602 via the group recommending system 120 as candidates for recommendation to receive the media content 800.

As described above, edges were formed between each of the undergraduate school attribute 202, the previous place of employment attribute 206, the previous place of employment attribute 208, and the current place of employment attribute 210 based on whether or not the builder 602 and the input users 304/306 and 606-616 shared these attributes. In a further embodiment, in addition to determining whether or not attributes are shared between a user and contacts in either a social or professional circle associated with a user, other indicia associated with the attributes in the user profiles, such as the time periods TP1-TP12, may be used by the group recommending system 120 to ascertain contacts for the message 300 when the builder 602 engages the selector 314.

In particular, referring back to FIG. 7, when the builder 602 reviews the recommended contacts suggested by the group recommending system 120, the builder 602, with reference to the undergraduate school attribute 202, can decide that only those contacts within the social or professional circles of the builder 602 who attended the same undergraduate school within the same time period should receive the media content 302. For example, the contact 610 attended the school associated with the undergraduate school attribute 202 during a time period TP8, which is different from the time period TP1, when the builder 602 attended the school associated with the undergraduate school attribute 202. Therefore, in an embodiment, when the builder 602 is recommended the input users 304/306 and the contacts 606-616 as candidates in the message 700, the builder 602 can delete the contact 610. Thus, if the builder 602 posts additional media content in the future, the contact 610 will no longer be recommended to the builder 602 by the group recommending system 120. Moreover, other contacts who attended the school associated with the undergraduate school attribute 202 during a time period TP different from the time period TP1 will not be recommended by the group recommending system 120.

As discussed above, contacts within the social or professional circles of a user may be suggested as recipients of a message having media content the user desires to send based on contacts the user initially inserts into the message by the group recommending system 120. In accordance with a further embodiment, contacts within the social or professional circles of a user may be suggested as recipients for a message having media content based on the reactions of others contacts within the social or professional circles of the user to media content shared by the user. As discussed above, the message 300 was created to share the media content, where the user entered the names of the input users 304/306 and further recipients were suggested based on the input users 304/306. Based on the suggestions, the message 802 was created that listed the input users 304/306 and 606-610 as recipients of the message 802. In a further embodiment, a message similar to the message 802 may automatically be created by the group recommending system 120 when a user, such as the builder 602, creates a communication for posting on a communication medium, such as creating a post on social media. To further illustrate, reference is now made to FIG. 9, which shows a post 900 including media content 902 in accordance with an embodiment of the present disclosure.

Figure 9:
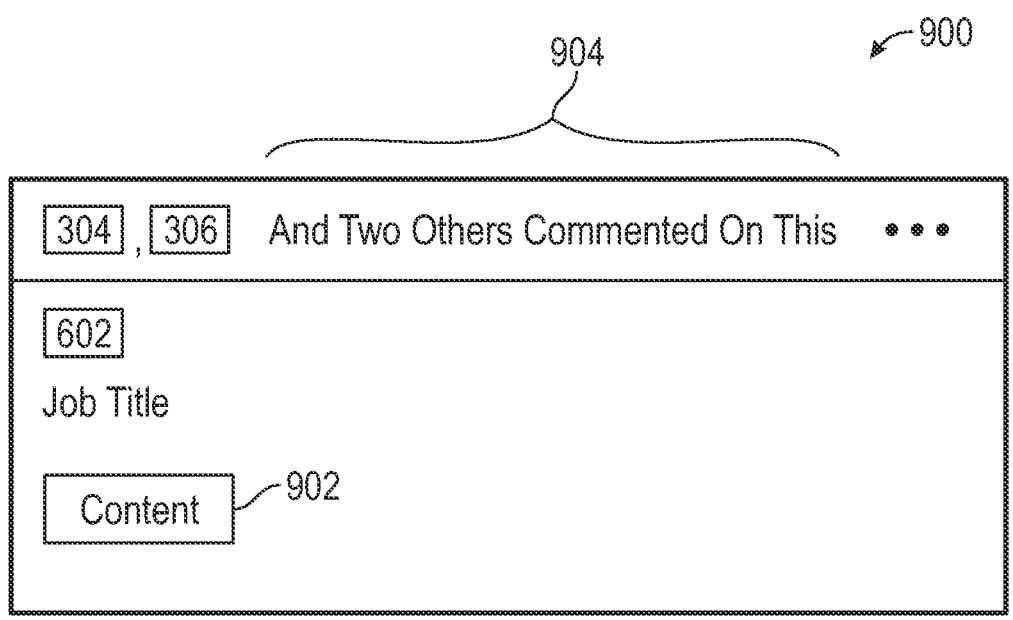
FIG. 9 shows a post including media content, in accordance with an embodiment of the present disclosure.

As may be seen with reference to FIG. 9, the builder 602 posted the media content 902 via the post 900 and the input users 304/306 commented on the post 900 as indicated at 904. In an example, the comments may include liking the post 900, disliking the post 900, or any other types of comments on the post 900. In accordance with an embodiment of the present disclosure, based on the candidates who commented on the post, such as the input users 304/306, the message 802 may automatically be created using the principles discussed above. More specifically, since the input user 304 commented on the post 900, the group recommending system 120 can search attributes in the user profile 400 associated with the input user 304 in order to determine attribute similarities between the user profile 400 and the user profile 200 associated with the user. Since the input user 306 also commented on the post 900, the group recommending system 120 can search attributes in the user profile 500 in order to determine attribute similarities between the user profile 500 and the user profile 200 associated with the user.

Figure 10:
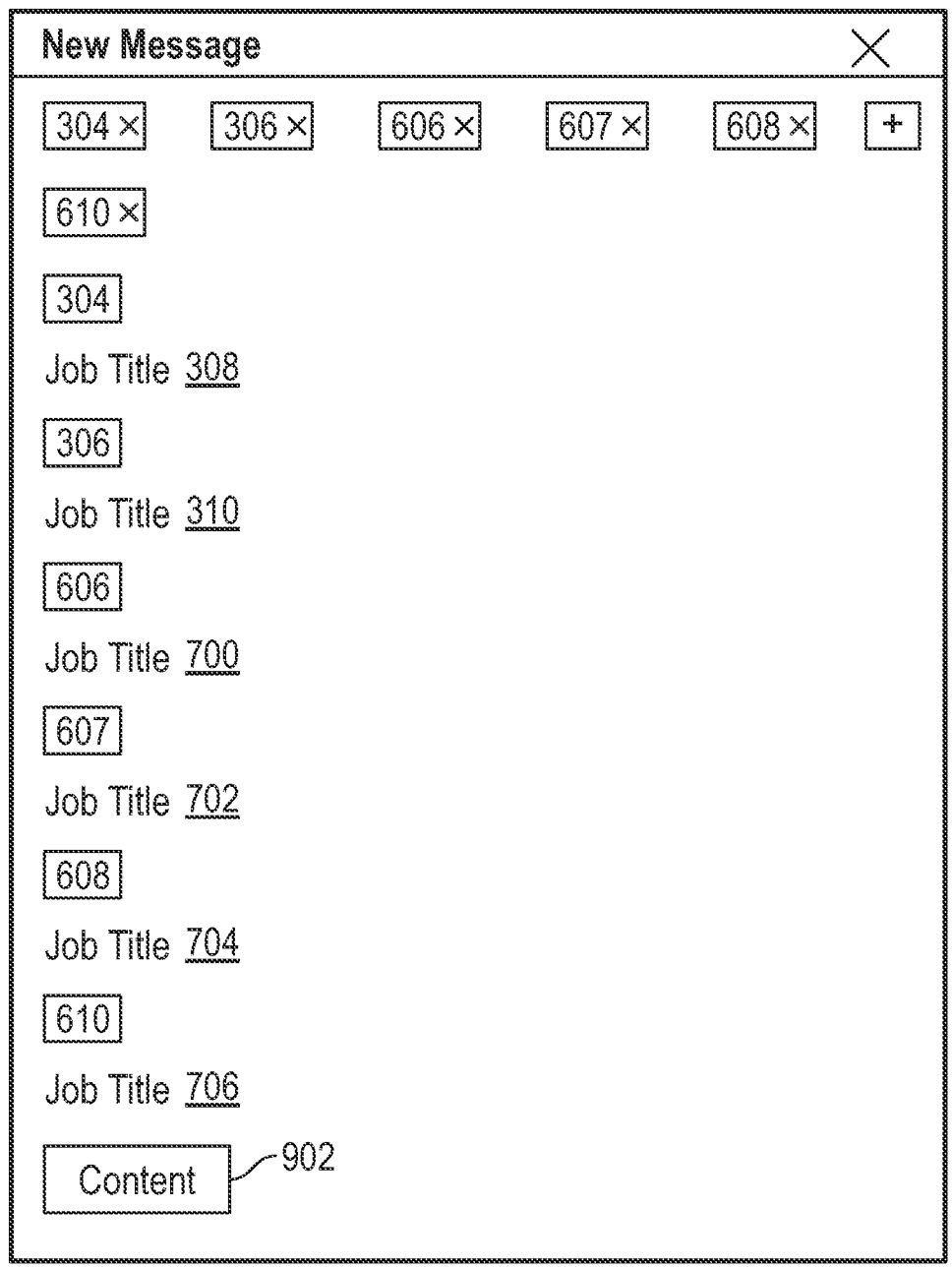
FIG. 10 illustrates a message that recommends contacts as additional recipients of media content a user desires to share, in accordance with embodiments of the present disclosure.

As discussed above, the group recommending system 120 recommended ones of the contacts 606-616 based on the builder 602 entering the input users 304/306 in the message as recipients of the post 900 and the media content 902. In a further embodiment, using the methodologies discussed above to recommend ones of the contacts 606-616 as candidates, the group recommendation system 120 can recommend ones of the contacts 606-616 to the builder 602 based on the input users 304/306 commenting on the post 900 and the media content 902 as a candidate to receive the media content 902. Therefore, the group recommending system 120 can automatically suggest the contacts 606-616 as candidates for recommendation without intervention from the builder 602, i.e., the viewer entering the 304/306 as discussed above with reference to FIG. 3. However, in this embodiment, in addition to suggesting the contacts, the group recommending system 120 can also automatically create a group communication session, such as a group chat generated with a messaging application, such as the messaging application available from LinkedIn™. To further illustrate, the group recommending system 120 can create the message 1000 that includes the media contact 902 and lists the input users 304/306 and 606-610, as shown with reference to FIG. 10. Also as discussed above, the builder 602 can then decide to send the message 1000 to the input users 304/306 and 606-610, or further modify the contacts, such as adding or deleting ones of the contacts, prior to sending the message 1000.

As noted above, the server system 106 employs artificial intelligence techniques (e.g., neural networks, natural language processing, classification algorithms, clustering algorithms, etc.) in order to identify and recommend contacts to a user. In an embodiment, a neural network is trained to provide contact recommendations to a user and receive feedback from the user regarding the contact recommendations. More specifically, in an embodiment, the group recommending system 120 employs the artificial intelligence techniques in order to identify and recommend contacts to a user. In particular, as noted above, when the builder 602 is presented with the message 714 listing the input users 304/306 and 606-616, the builder 602 selected the contacts 606-610. The group recommending system 120 can recognize that the builder 602 decided that those contacts who only share the previous place of employment attribute 206 should not receive message 300 along with the media content 302, which related to matters associated with the current place of employment as reflected in the current place of employment attribute 210. Furthermore, the group recommending system 120 can recognize that the media content 302 related to contact associated with the current place of employment of the builder 602. Thus, using well-known machine learning processes, such as logistic regression analysis, Random Forest regression, XGBoost decision trees, or the like. the group recommending system 120 can determine that when the builder 602 desires to send media content associated with the current place of employment of the builder 602, the group recommending system 120 can recognize that if a suggested contact only shares the previous place of employment attribute 206, the group recommending system 120 recognizes that the contact should not be recommended to the builder 602 as a candidate using machine learning processes. If the builder 602 continues to reject contact suggestions in relation to other types of media content, i.e., media associated with a graduate school of the builder 602, where the suggested contact only shares the previous place of employment attribute 206, the group recommending system 120 can learn that contacts only sharing the previous place of employment attribute 206 should not be recommended to the builder 602 as candidates.

Moreover, machine learning may be used to assign a score and increment a score, as discussed herein. Therefore, as part of the process of identifying similarities between a builder sharing content and candidate users who may be recommended to be part of the community, machine learning may be used to assign a score and increment a score while identifying candidate users, in accordance with an embodiment.

While a machine learning process for the group recommending system has been described with respect to the previous place of employment attribute 206, it should be noted that the same principles can be applied to any type of attribute shared between the builder 602 and contacts within social or professional circles of the builder 602. For example, the same principles can be applied to the undergraduate school attribute 202, the graduate school attribute 204, the previous place of employment attribute 206, the previous place of employment attribute 208, the current place of employment attribute 210, the professional conference attendee attribute 212, or the job description attribute 214, or any combination of these attributes.

In a further embodiment, the same machine learning techniques employed by the group recommending system 120 can be employed to the embodiment discussed above with reference to FIGS. 9 and 10. More specifically, when the input users 304/306 comment on the post 900 and the content 902, the group recommending system 120 uses the principles discussed above to suggest contacts within the social or professional circles of the builder 602 when generating the message 1000.

Figure 11:
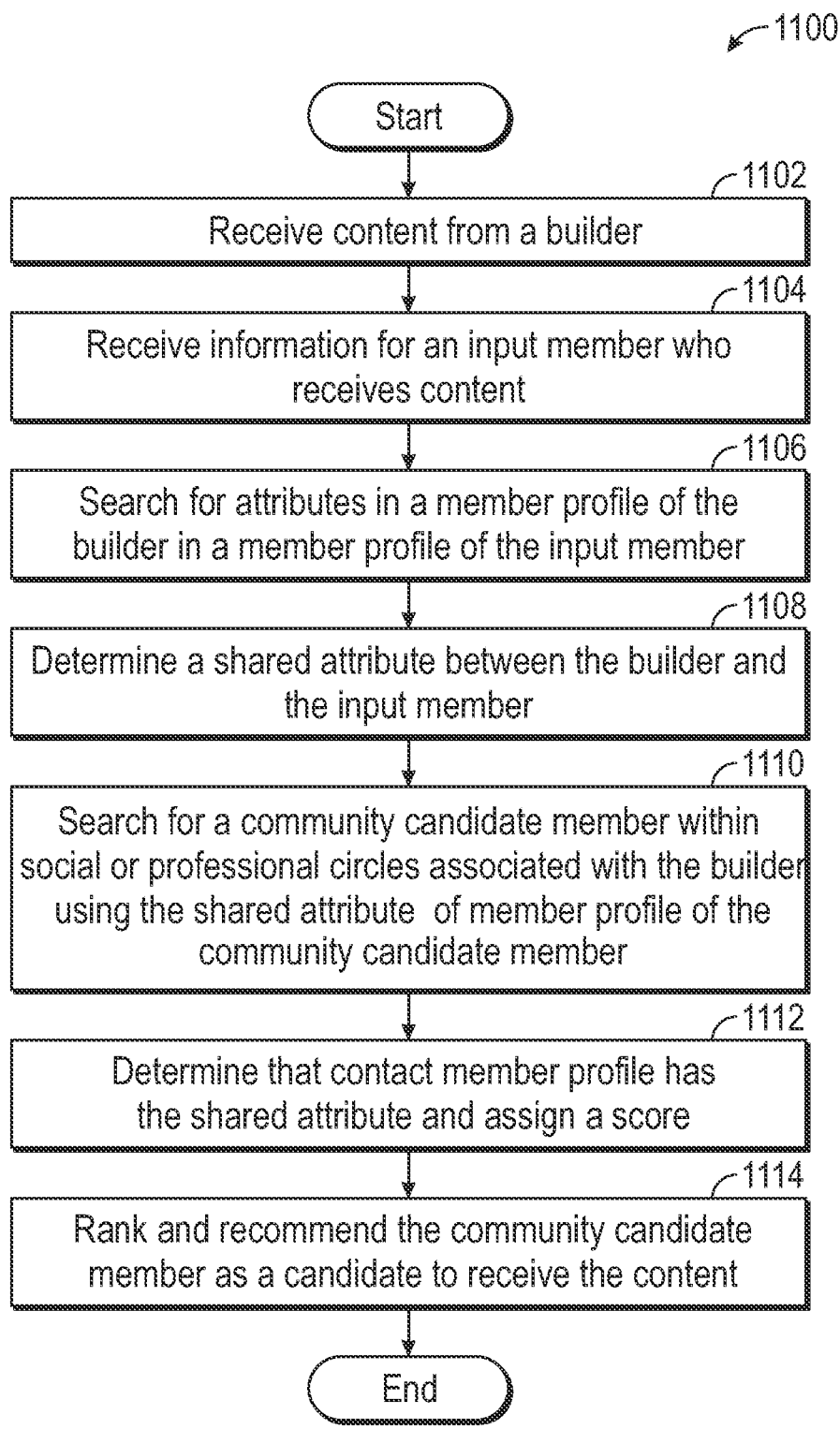
FIG. 11 shows a method for recommending contacts for a group communication session, in accordance with an embodiment of the present disclosure.

Now making reference to FIG. 11, a method 1100 for recommending contacts for a group communication session is shown in accordance with an embodiment of the present disclosure. The method 1100 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 106 of FIG. 1. Initially, in an operation 1102, content, such as media content, is received from a builder. After the content is received from the builder in the operation 1102, an operation 1104 is performed where information for an input user is received. In an embodiment, receiving recipient information for the input user can include receiving information for one or more candidate users who may be recommended to be part of the community that within a social or professional circle of the builder. For purposes of the discussion with regards to FIG. 11 and, further on, FIG. 12, these candidates will be referred to as community candidate users. Moreover, in an embodiment, this information can be received from the builder or from a network system, such as the group recommending system 120, as discussed above with reference to FIG. 9 and the post 900.

In an example, the content may be media content, such as the media content 302, where the media content 302 that is received during the operation 1102 is received at the server system 106 when a builder, such as the builder 602, desires to create a group communication in order to share the content, such as the message 300. In the example, when the builder 602 creates the message 300, the builder also enters the input users 304/306 as recipient information where the input users 304/306 are to receive the message 300 and the media content 302 such that the server system 106 receives the recipient information for the input users 304/306 in the operation 1104.

Returning to the method 1100, after the recipient information is received from the builder, the method 1100 searches for attributes that are in a user profile of the builder and are also in a user profile of the input user in an operation 1106 and then determines a shared attribute between the user profile of the builder and the user profile of the input user in an operation 1108. In an embodiment, any type of algorithm capable of traversing or searching tree or graph data structures, such as a breadth-first search (BFS), may be used to search for attributes that are in a user profile of the builder and are also in a user profile of the input user. Moreover, in an embodiment, a search such as the BFS, may be limited to a depth of two within a tree or graph data structure. However, a search may be conducted to any depth within a tree or graph data structure in accordance with embodiments. In an embodiment, attributes that are exclusive to contacts and not in the profile for the builder may also be searched. To further illustrate, the contacts may have an attribute corresponding to a place of employment at which the builder did not work. This place of employment can be used as an attribute to conduct a search. As noted above, the same attribute is assigned that same unique identifier. Thus, the undergraduate school attribute 202 corresponded to the Georgia Institute of Technology™ is assigned a unique identifier. In an embodiment, when the unique identifier associated with the Georgia Institute of Technology™ is identified in the user profile of the builder, this unique identifier is searched for in the user profile of the input user in the operation 1106. In an embodiment, when the unique identifier is located, the attribute associated with the unique identifier is a shared attribute. In an embodiment, all shared attributes between the user profile of the builder and the user profile of the input user are determined. It should be noted that in accordance with embodiments, the operations 1106 and 1108 may be performed with multiple community candidate users or input users who the builder deems to be candidates. It should also be noted that all attributes in the user profile of the builder are searched using unique identifiers associated with the attributes in the user profile of the builder.

Returning to the example, in the operation 1106, the group recommending system 120 searches for attributes in the user profile 200 that are also in the user profile 400 associated with the input user 304 and the user profile 500 associated with the input user 306 in the operation 1106. In the example, the group recommending system 120 determines that the user profiles 200, 400, and 500 each share the undergraduate school attribute 202 and the current place of employment attribute 210 in the operation 1108.

After determining a shared attribute between the builder and the first candidate, the method 1100 searches for a community candidate user within the social or professional circles associated with the builder using the shared attribute in an operation 1110. In particular, the method 1100 searches for all contacts that have the shared attribute of the builder, such as the builder 602. In an embodiment, the ability to search all contacts allows for quick slicing of the network of a builder and for quick score determination, as discussed above. In particular, the user profile of the community candidate includes the shared attribute identified in the operation 1106. It should be noted that while the method 1100 describes only searching for one community candidate user, embodiments envision simultaneously searching for multiple community candidate users with the shared attribute by simultaneously identifying the shared attribute in multiple user profiles of multiple community candidate users within the social or professional circles associated with the builder. After searching for a community candidate user in the operation 1110, when a community candidate user profile is found, the method 1100 determines that the community user profile of candidate user includes the shared attribute in an operation 1112. In the operation 1112, the method 1100 determines that the user profile of the community candidate user includes the shared attribute and assigns a score based on the determination. It should be noted that in embodiments where the multiple community candidate users are being simultaneously searched by simultaneously identifying the shared attribute in multiple user profiles, the method 1100 can determine that the user profiles of the multiple community candidate users include the shared attribute.

Returning to the example, during the operation 1110, the group recommending system 120 searches for community candidate users that are within social and professional circles associated with the builder 602. In the example, during the operation 1110, the group recommending system 120 searches the user profiles associated with the contacts 606-616 and determines that the user profiles of the contacts 606-610, 612, and 614 include the shared attributes. In particular, in the example, the group recommending system 120 determines that the user profiles of the contacts 606, 607, and 610 include the undergraduate school attribute 202 during the operation 1112. In addition, during the operation 1112, the group recommending system 120 determines that the user profiles of the contacts 606, 607, and 610 include the attribute 206. Moreover, during the operation 1112, the group recommending system 120 determines that the user profiles of the contacts 606-608 and 614 include the current place of employment attribute 210. In the example, the group recommending system 120 can assign scores to each of the contacts 606, 607, and 610 based on the number of attributes each of the contacts share with each of the input users 304/306. As detailed above, since the contacts 606 and 607 share the attributes 202 and 210 with the input user 304 and with the input user 306, the group recommending system 120 can assign a score of four to each of the contacts 606 and 607 as discussed above. Additionally, since the contact 610 shares the attribute 202 with each of the candidates 304 and 306, the group recommending system 120 can assign a score of two to the contact 610. Furthermore, since the contact 612 shared the attribute 206, the contact 612 will be assigned a score of one.

Returning to FIG. 11 and the method 1100, after determining that that the community candidate user profile includes the shared attribute, the method 1100 performs an operation 1114, where the method 1100 recommends the community candidate user as a candidate to receive of the content received in the operation 1102. In the example, in the operation 1114, the group recommending system 120 recommends the contacts 606-610, 612, and 614 to the user as potential candidates to receive the content 302 in the operation 1114. In particular, the group recommending system 120 generates the message 714, which includes the contacts 606-610, 612, and 614 as candidates for recommendation as potential recipients of the media content 302.

Figure 12:
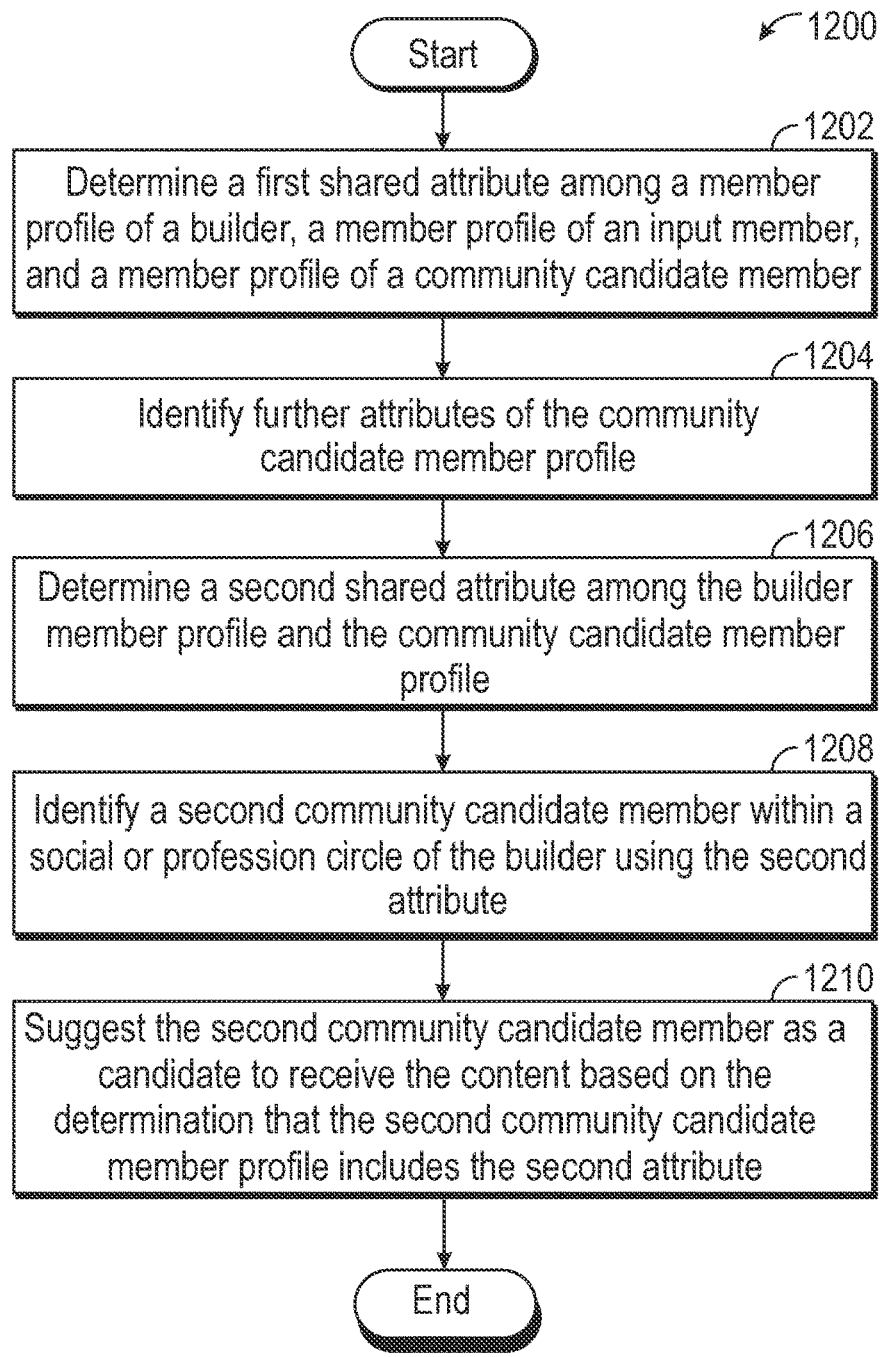
FIG. 12 shows a method of recommending recipients of content a user desires to share based on attributes in user profiles of contacts recommended by a group recommending system, in accordance with embodiments of the present disclosure.

In addition to recommending candidates based on attributes shared between the user and the contacts either provided by the user or the group recommending system 120, in an embodiment, candidates can be recommended based on attributes in user profiles of the community candidate users recommended by the group recommending system 120, as shown by the method 1200 of FIG. 12. The method 1200 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 106 of FIG. 1. Initially, in an operation 1202, a first shared attribute among a user profile of a builder, a user profile of an input user suggested by the user, and a user profile of a community candidate user is determined. In accordance with an embodiment, the first shared attribute among the user profiles of the builder, the input user, and the community candidate user can be determined in accordance with the operations 1106-1112 discussed with reference to FIG. 11.

After performing the operation 1202, the method 1200 performs an operation 1204 where further attributes of the builder user profile of user are identified. In an embodiment, as discussed with reference to FIG. 11, the community candidate user is determined in the operations 1110 and 1112. After identifying further attributes of the builder user profile that are in the user profile of the community candidate user, a second attribute that is shared among the builder user profile and the user profile of the contact is determined in an operation 1206. In an example, in the operation 1202, the group recommending system 120 determines that the user profiles of the contacts 606, 607, and 610 include the undergraduate school attribute 202 during the operation 1112. Moreover, during the operation 1204, the group recommending system 120 determines that the user profiles of the contacts 606-608 and 614 include the current place of employment attribute 210. In the operation 1206, the group recommending system 120 determines that the user profile 200 of the builder 602 and the user profile of the contact 610 share the previous place of employment attribute 206. Furthermore, in the operation 1206, the group recommending system 120 determines that the user profile 200 of the builder 602 and the user profile of the contact 614 share the previous place of employment attribute 208. It should be noted that the contacts 606-610 and 614 were not recommended by the builder 602. Instead, they were found by the group recommending system 120 based on other input users suggested by the builder 602, as discussed above. Thus, in embodiments, the second shared attribute, which is being used to determine further contacts, is found based on a further identification of attributes.

Returning to FIG. 12 and the method 1200, after performing the operation 1206, the method 1200 performs the operation 1208, where a second community candidate user within a social or professional circle of the builder is identified using the second attribute. It should be noted that while only conducting a search for single community candidate user is discussed in the operation 1208, in an embodiment, multiple community candidate users can be simultaneously searched for in the operation 1208. In the example, in the operation 1208, the group recommending system 120 identifies additional community candidate users in the operation 1202 using the previous place of employment attribute 206 and the previous place of employment attribute 208.

Turning attention back to FIG. 12 and the method 1200, after performing the operation 1208, the method 1200 performs the operation 1210, where the method 1200 recommends the second community candidate user as a recipient of the content based on the determination that the user profile of the third community candidate user includes second attribute. In the example, in the operation 1210, the group recommending system 120 recommends the contacts 612 and 616 to the builder 602 as potential recipients of the content. In particular, the group recommending system 120 generates the message 714, which includes the contacts 612 and 616 as potential recipients of the media content 302.

It should be pointed out that in some instances, when a builder, such as the builder 602, desires to send content and the builder 602 does not input initial seed and instead only provides the content 302, the group recommending system 120 can recommend a candidate to receive the content 302 based on contacts of the builder 602. An example of a seed would be an initial input user. Thus, when the builder desires to send content, in an embodiment, the builder does not input an initial input user and instead, the group recommending system 120 can suggest recipients based on the content desired to be sent. The group recommending system 120 can determine which of the contacts of the builder are highly connected to the content 302. To further illustrate, if the content 302 relates to an alumni event at the Georgia Institute of Technology™ that corresponds to the undergraduate school attribute 202, the group recommending system 120 will search for contacts of the builder that include the undergraduate school attribute 202, such as the input users 304/306 and the contacts 606, 607, and 610. Moreover, the group recommending system 120 can recommend the input users 304/306 and the contacts 606, 607, and 610 as candidates to receive the content 302.

Figure 13:
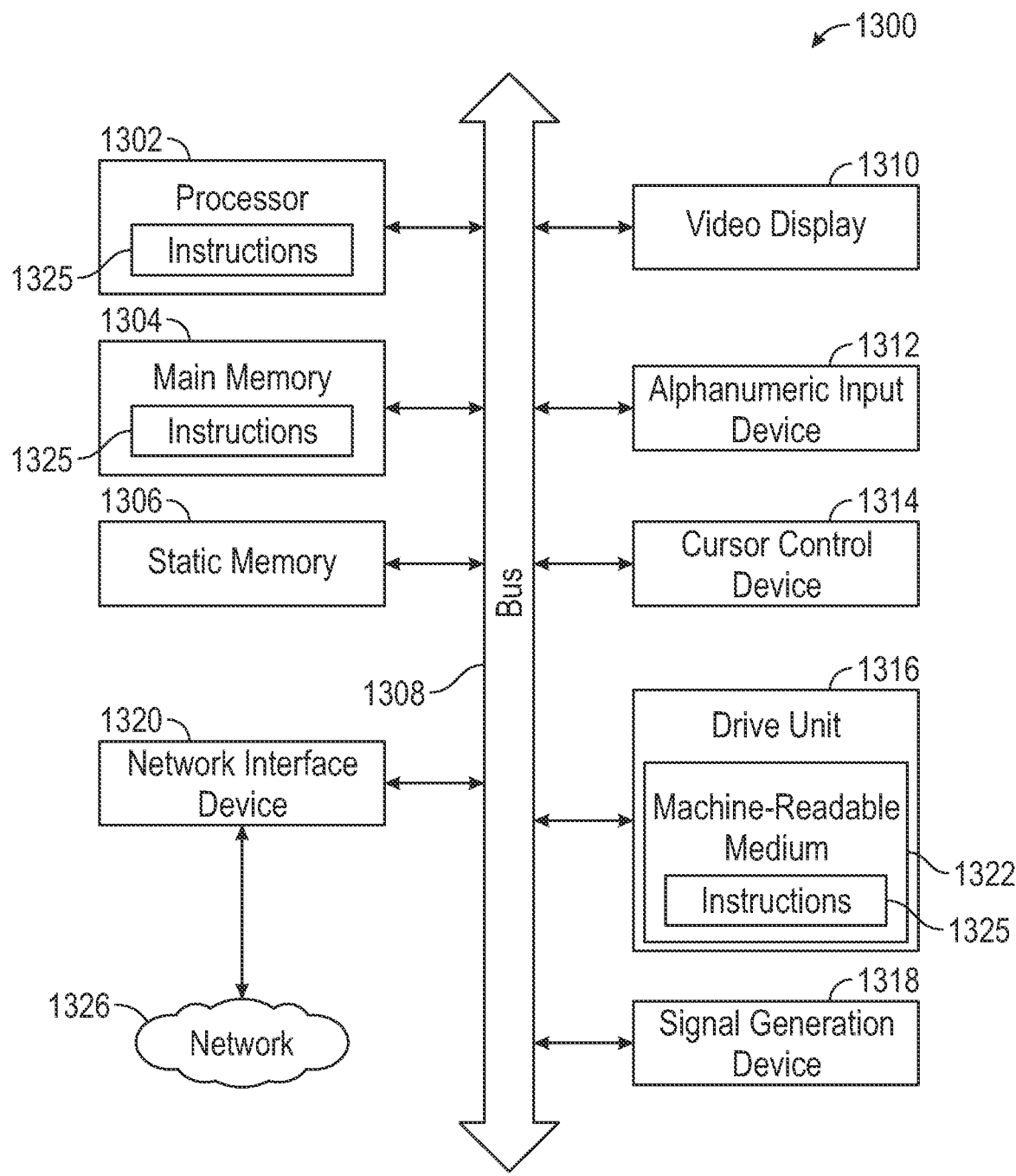
FIG. 13 is a diagrammatic representation of an example machine in the form of a computer system within which a set of instructions, for causing the machine to perform any one or more of the methodologies discussed herein, may be executed.

FIG. 13 is a diagrammatic representation of a machine in the example form of a computer system 1300 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alpha-numeric input device 1312 (e.g., a keyboard), a user interface (UI) navigation device 1314 (e.g., a cursor control device), a disk drive unit 1316, a signal generation device 1318 (e.g., a speaker) and a network interface device 1320.

The disk drive unit 1316 includes a machine-readable medium 1322 on which is stored one or more sets of instructions and data structures (e.g., instructions 1325) embodying or utilized by any one or more of the methodologies or functions described herein. The instructions 1325, which can be software, can also reside, completely or at least partially, within the main memory 1304 and/or within the processor 1302 during execution thereof by the computer system 1300, with the main memory 1304 and the processor 1302 also constituting machine-readable media.

The instructions 1325 further be transmitted or received over a network 1326 via the network interface device 1320 utilizing any one of a number of well-known transfer protocols (e.g., Hyper Text Transfer Protocol (HTTP)).

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system for determining connection suggestions in an online social network system have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:
1. A method comprising:
receiving, by a network server system, content from a user for distribution via a message;
receiving, by the network server system, information for a first candidate associated with the user, the first candidate receiving the content and the message, the user having a user profile and the first candidate having a first candidate profile, the user profile having attributes and the first candidate profile having attributes;
searching, by at least one hardware processor of the network server system, for profile attributes that are in the user profile and the first candidate profile to determine shared attributes in the user profile where each of the user profile and the first candidate profile have at least one of the shared attributes;
searching, by the at least one hardware processor of the network server system, for a contact associated with the user using the at least one of the shared attributes, the contact having a user profile that includes attributes where searching for the contact includes searching for the at least one of the shared attributes in the user profile of the contact that includes the attributes;
determining, by the at least one hardware processor of the network server system, that the user profile of the contact has a shared attribute, wherein the shared attribute has a unique identifier and determining that the user profile of the contact has the shared attribute includes identifying the unique identifier;
assigning a score to the contact based on the user profile of the contact including the at least one of the shared attributes;

ranking the contact based on the score; and
recommending, by the at least one hardware processor of the network server system, the contact to the user as a second candidate to receive the message and the content based on determining that the user profile of the contact includes the shared attribute, wherein the user selects the contact as the second candidate to receive the message and the content, wherein the recommendation is based on the ranking assigned to the contact.

2. The method of claim 1, the method further comprising:
receiving a selection from the user, where the selection from the user selects to keep the second candidate as a recipient of the message and the content;
assigning a weight to the shared attribute where the weight increases a score assigned to the second candidate;
inputting the shared attribute and the weight as training data for a machine learning model; and
training the machine learning model with the training data using one of logistic regression analysis, Random Forest regression, or Extreme Gradient Boosting (XG Boost) decision trees.

3. The method of claim 1, the method further comprising:
receiving a selection from the user, where the selection from the user selects to reject the second candidate as a recipient of the message and the content;
assigning a weight to the shared attribute where the weight decreases a score assigned to the second candidate;
inputting the shared attribute and the weight as training data for a machine learning model; and
training the machine learning model with the training data using one of logistic regression analysis, Random Forest regression, or Extreme Gradient Boosting (XG Boost) decision trees.

4. The method of claim 1, wherein the score is variable based on a number of attributes shared between the contact and the user.

5. The method of claim 1, the method further comprising:
searching the attributes of the user profile of the contact to determine a second shared attribute in the user profile and the user profile of the contact where each of the user profile and the user profile of the contact includes the second shared attribute;
searching for a second contact associated with the user using the second shared attribute, the second contact having a user profile that includes attributes where searching for the second contact includes searching for the second shared attribute in the attributes of the user profile of the second contact;
determining, by the at least one hardware processor of the network server system, that the user profile of the second contact includes the second shared attribute; and
suggesting, by the at least one hardware processor of the network server system, the second contact to the user as a third candidate to receive the message and the content based on determining that the user profile of the second contact includes the second shared attribute, wherein the user selects the third candidate as a recipient of the message and the content.

6. The method of claim 5, the method further comprising assigning a weight, wherein the weight is variable based on one of the shared attribute, the shared attributes, or the second shared attribute.

7. The method of claim 6, the method further comprising:
receiving a selection from the user, where the selection from the user selects to keep the third candidate as the recipient of the message and the content;
inputting one of the shared attribute, the shared attributes, or the second shared attribute as training data for a machine learning model; and
training the machine learning model with the training data, wherein training includes determining the weight assigned to one of the contact or the second contact based on one of the shared attribute, the shared attributes, or the second shared attribute and using one of logistic regression analysis, Random Forest regression, or Extreme Gradient Boosting (XG Boost) decision trees.

8. The method of claim 6, the method further comprising:
receiving a selection from the user, where the selection from the user selects to reject the third candidate as the recipient of the message and the content;
inputting one of the shared attribute, the shared attributes, or the second shared attribute as training data for a machine learning model; and
training the machine learning model with the training data, wherein training includes determining the weight assigned to one of the contact or the second contact based on one of the shared attribute, the shared attributes, or the second shared attribute and using one of logistic regression analysis, Random Forest regression, or Extreme Gradient Boosting (XG Boost) decision trees.

9. A system comprising:
one or more processors; and
a non-transitory computer readable storage medium comprising instructions that when executed by the one or more processors cause the one or more processors to perform operations comprising:
receiving, by a network server system, content from a user for distribution via a message;
receiving, by the network server system, information for a first candidate associated with the user, the first candidate receiving the content and the message, the user having a user profile and the first candidate having a first candidate profile, the user profile having attributes and the first candidate profile having attributes;
searching, by at least one hardware processor of the network server system, for profile attributes that are in the user profile and the first candidate profile to determine shared attributes in the user profile where each of the user profile and the first candidate profile have at least one of the shared attributes;
searching, by the at least one hardware processor of the network server system, for a contact associated with the user using the at least one of the shared attributes, the contact having a user profile that includes attributes where searching for the contact includes searching for the at least one of the shared attributes in the user profile of the contact that includes the attributes;
determining, by the at least one hardware processor of the network server system, that the user profile of the contact has a shared attribute, wherein the shared attribute has a unique identifier and determining that the user profile of the contact has the shared attribute includes identifying the unique identifier;
assigning a score to the contact based on the user profile of the contact including the at least one of the shared attributes;

ranking the contact based on the score; and
recommending, by the at least one hardware processor of the network server system, the contact to the user as a second candidate to receive the message and the content based on determining that the user profile of the contact includes the shared attribute, wherein the user selects the contact as the second candidate to receive the message and the content, wherein the recommendation is based on the ranking assigned to the contact.

10. The system of claim 9, wherein the non-transitory computer readable storage medium comprises further instructions that when executed by the one or more processors cause the one or more processors to perform further operations comprising:
receiving a selection from the user, where the selection from the user selects to keep the contact as a recipient of the message and the content;
assigning a weight to the shared attribute where the weight increases a score assigned to the second candidate;
inputting the shared attribute and the weight as training data for a machine learning model; and
training the machine learning model with the training data using one of logistic regression analysis, Random Forest regression, or Extreme Gradient Boosting (XG Boost) decision trees.

11. The system of claim 9, wherein the non-transitory computer readable storage medium comprises further instructions that when executed by the one or more processors cause the one or more processors to perform further operations comprising:
receiving a selection from the user, where the selection from the user selects to reject the second candidate as a recipient of the message and the content;
assigning a weight to the shared attribute where the weight decreases a score assigned to the second candidate;
inputting the shared attribute and the weight as training data for a machine learning model; and
training the machine learning model with the training data using one of logistic regression analysis, Random Forest regression, or Extreme Gradient Boosting (XG Boost) decision trees.

12. The system of claim 9, wherein the score is variable based on a number of attributes shared between the contact and the user.

13. The system of claim 9, wherein the non-transitory computer readable storage medium comprises further instructions that when executed by the one or more processors cause the one or more processors to perform further operations comprising:
searching the attributes of the user profile of the contact to determine a second shared attribute in the user profile and the user profile of the contact where each of the user profile and the user profile of the contact includes the second shared attribute;
searching for a second contact associated with the user using the second shared attribute, the second contact having a user profile that includes attributes where searching for the second contact includes searching for the second shared attribute in the attributes of the user profile of the second contact;
determining, by the at least one hardware processor of the network server system, that the user profile of the second contact includes the second shared attribute; and
suggesting, by the at least one hardware processor of the network server system, the second contact to the user as a third candidate to receive the message and the content based on determining that the user profile of the second contact includes the second shared attribute, wherein the user selects the second contact as the third candidate to receive the message and the content.

14. The system of claim 13, wherein the non-transitory computer readable storage medium comprises further instructions that when executed by the one or more processors cause the one or more processors to perform further operations comprising assigning a weight, wherein the weight is variable based on one of the shared attribute, the shared attributes, or the second shared attribute.

15. The system of claim 14, wherein the non-transitory computer readable storage medium comprises further instructions that when executed by the one or more processors cause the one or more processors to perform further operations comprising:
receiving a selection from the user, where the selection from the user selects to keep the second contact as a recipient of the message and the content;
inputting one of the shared attribute, the shared attributes, or the second shared attribute as training data for a machine learning model; and
training the machine learning model with the training data, wherein training includes determining the weight assigned to one of the contact or the second contact based on one of the shared attribute, the shared attributes, or the second shared attribute and using one of logistic regression analysis, Random Forest regression, or Extreme Gradient Boosting (XG Boost) decision trees.

16. The system of claim 14, wherein the non-transitory computer readable storage medium comprises further instructions that when executed by the one or more processors cause the one or more processors to perform further operations comprising:
receiving a selection from the user, where the selection from the user selects to reject the second contact as the recipient of the message and the content;
inputting one of the shared attribute, the shared attributes, or the second shared attribute as training data for a machine learning model; and
training the machine learning model with the training data, wherein training includes determining the weight assigned to one of the contact or the second contact based on one of the shared attribute, the shared attributes, or the second shared attribute and using one of logistic regression analysis, Random Forest regression, or Extreme Gradient Boosting (XG Boost) decision trees.

17. A machine-readable non-transitory storage medium having instruction data executable by a machine to cause the machine to perform operations comprising:
receiving, by a network server system, content from a user for distribution via a message;
receiving, by the network server system, information for a first candidate associated with the user, the first candidate receiving the content and the message, the user having a user profile and the first candidate having a first candidate profile, the user profile having attributes and the first candidate profile having attributes;
searching, by at least one hardware processor of the network server system, for profile attributes that are in the user profile and the first candidate profile to determine shared attributes in the user profile where each of the user profile and the first candidate profile have at least one of the shared attributes;

searching, by the at least one hardware processor of the network server system, for a contact associated with the user using the at least one of the shared attributes, the contact having a user profile that includes attributes where searching for the contact includes searching for the at least one of the shared attributes in the user profile of the contact that includes the attributes;

determining, by the at least one hardware processor of the network server system, that the user profile of the contact has a shared attribute, wherein the shared attribute has a unique identifier and determining that the user profile of the contact has the shared attribute includes identifying the unique identifier;

assigning a score to the contact based on the user profile of the contact including the at least one of the shared attributes;

ranking the contact based on the score; and recommending, by the at least one hardware processor of the network server system, the contact to the user as a second candidate to receive the message and the content based on determining that the user profile of the contact includes the shared attribute, wherein the user selects the contact as the second candidate to receive the message and the content, wherein the recommendation is based on the ranking assigned to the contact.

18. The machine-readable non-transitory storage medium of claim 17, wherein the instruction data further causes the machine to perform further operations comprising:

receiving a selection from the user, where the selection from the user selects to keep the second candidate as a recipient of the message and the content;

assigning a weight to the shared attribute where the weight increases a score assigned to the second candidate;

inputting the shared attribute and the weight as training data for a machine learning model; and training the machine learning model with the training data using one of logistic regression analysis, Random Forest regression, or Extreme Gradient Boosting (XG Boost) decision trees.

19. The machine-readable non-transitory storage medium of claim 17, wherein the instruction data further causes the machine to perform further operations comprising:

receiving a selection from the user, where the selection from the user selects to reject the second candidate as a recipient of the message and the content;

assigning a weight to the shared attribute where the weight decreases a score assigned to the second candidate;

inputting the shared attribute and the weight as training data for a machine learning model; and training the machine learning model with the training data using one of logistic regression analysis, Random Forest regression, or Extreme Gradient Boosting (XG Boost) decision trees.

\* \* \* \* \*